UNITED STATES PATENT OFFICE.

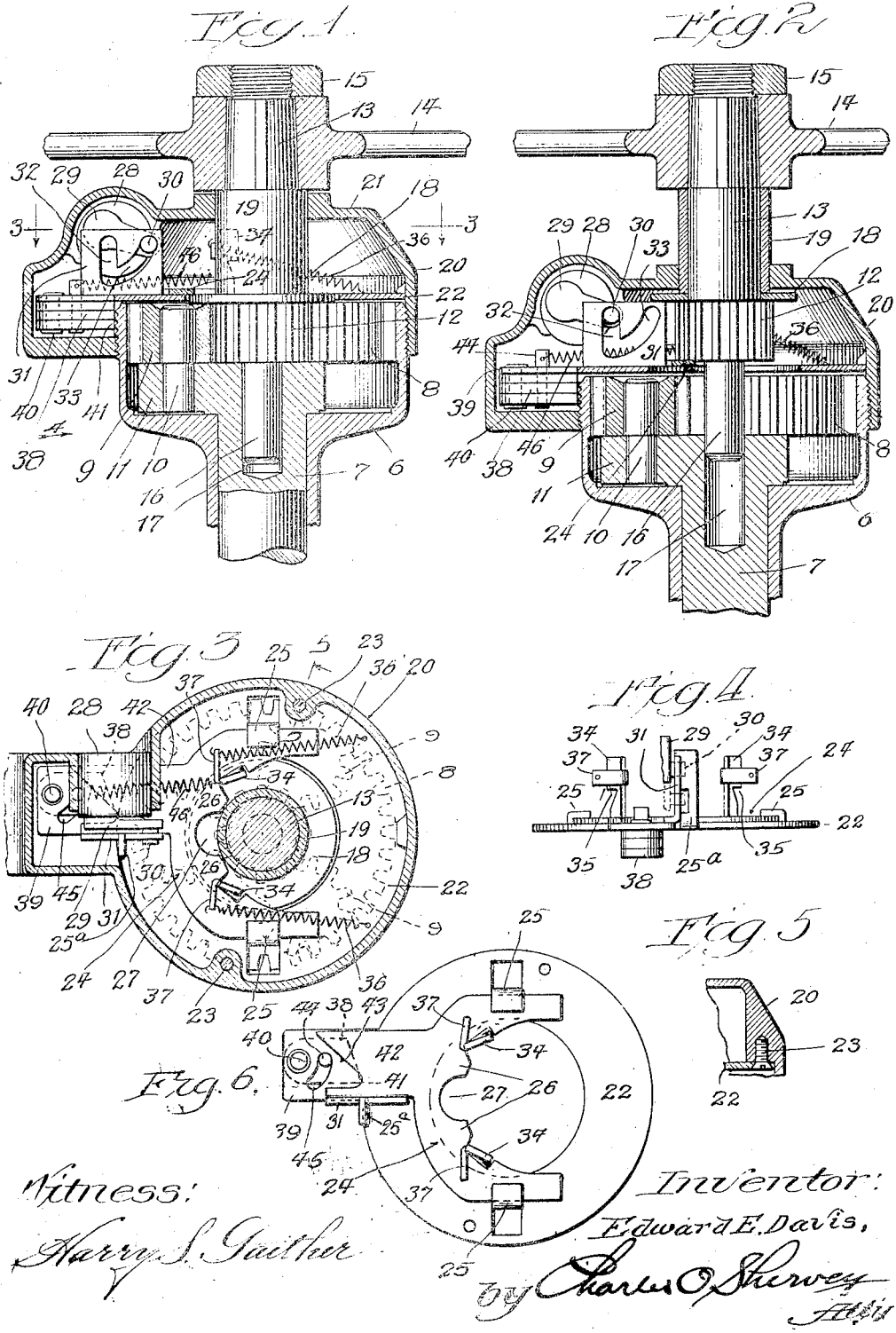

EDWARD E. DAVIS, OF CHICAGO, ILLINOIS, ASSIGNOR TO SECURITY AUTO LOCK COMPANY, OF CHICAGO, ILLINOIS, A CORPORATION OF ILLINOIS.

LOCKING DEVICE FOR AUTOMOBILES.

1,321,190. Specification of Letters Patent. Patented Nov. 11, 1919.

Application filed January 14, 1918. Serial No. 211,762.

*To all whom it may concern:*

Be it known that I, EDWARD E. DAVIS, a citizen of the United States, and a resident of Chicago, county of Cook, and State of Illinois, have invented certain new and useful Improvements in Locking Devices for Automobiles, of which the following is declared to be a full, clear, and exact description.

This invention relates to locking devices for automobiles and it has been especially designed for use in connection with the steering gearing of "Ford" automobiles.

This invention is in the nature of an improvement upon the locking device shown and described in my prior Patent No. 1,205,124, dated November 14, 1916.

In locks of this type the steering wheel is rendered idle or inactive to prevent the automobile from being driven or towed away by an unauthorized person, but I have found that it is possible (in view of the construction of the "Ford" parts) for an unauthorized person to make the steering wheel effective without the use of a proper key to unlock the lock. This has been accomplished by removing the steering wheel from the stud shaft and pounding the latter down through the sleeve and washer until the center pinion is brought into mesh with the other pinions of the planetary gearing. This is possible because in the present construction of the "Ford" gearing, the sleeve and washer are secured on the stud shaft by a driving fit and although they are supported by the lock bolt (when the steering wheel is inactive) the stud shaft with its pinion may be forced down. To drive the automobile away, the unauthorized person replaces the steering wheel on the protruding end of the stud shaft, thus making it possible for him to steer the vehicle. With the present invention, as well as the one shown and described in my prior patent, all of the ordinary and well known parts of the "Ford" steering gearing are retained except the cap, which is removed and replaced by a cap containing the locking mechanism.

The primary object of this invention is to provide means whereby the steering wheel, stud shaft and its pinion cannot be forced to its lower or active position unless the proper key is inserted in the lock and the same manipulated to withdraw the pinion supporting means from its position supporting the pinion. Other objects and advantages will appear in the course of this specification and with all of said objects and advantages in view, this invention consists in the several novel features of construction, arrangement and combination of parts hereinafter set forth and more particularly defined in the claims.

The invention is clearly illustrated in the drawings accompanying this specification in which:—

Figure 1, is a central longitudinal section through a steering gearing for automobiles, illustrating a simple form of the present invention applied thereto, the steering wheel being shown in its lowered or active position; Fig. 2, is a central vertical longitudinal section of the device, but showing the steering wheel in its raised or inactive position; Fig. 3, is a horizontal section taken on the line 3—3 of Fig. 1; Fig. 4, is an end view of certain members of the locking mechanism looking in the direction of the arrow 4 in Fig. 1; Fig. 5, is a detail vertical cross section taken on the line 5—5 of Fig. 3, and Fig. 6, is a plan of the parts seen in Fig. 4.

Referring to said drawings, the reference character 6, designates the usual housing which is located at the top of the steering column of an ordinary "Ford" automobile and 7, designates the steering post of the steering gear. In accordance with the usual practice, the housing is formed with an internal gear 8, which forms part of a planetary gearing, the other members of which comprise pinions 9, which mesh with the internal gear and all journaled on stud shafts or pins 10, fixedly mounted in a head 11, upon the upper end of the post 7. The pinions 9, are adapted to mesh with a center pinion 12, formed integral with a stud shaft 13, to which is keyed, or otherwise secured, the steering wheel 14, which is held in position upon said stud shaft 13, by a nut 15, as is usual. Below the center pinion 12, the stud shaft is reduced in diameter as at 16, and is mounted to move vertically in a socket 17, formed in the steering post 7. Secured on the stud shaft 13, above the center pinion 12, is a washer 18, which is held in place by a sleeve 19, driven upon the stud shaft and held in place thereon by friction. The parts thus far described in detail are the ordinary "Ford" parts that comprise (with the usual cap) the steering gearing of the "Ford" automobiles.

The upper end of the housing 6, is externally screw threaded, and a cap 20, is secured upon said threaded portion. The top 21, of said cap is spaced sufficiently above the top of the housing to permit the center pinion 12, to be raised above the pinions 9, whereby when held in such raised position the turning of the steering wheel 14, will have no effect upon the remainder of the steering mechanism. The means for supporting the steering wheel in such raised position and which comprises the essential features of the locking mechanism of the present invention will now be described.

Secured in the cap 20, as by screws 23, is a centrally apertured plate or disk 22, and this plate is arranged to be located immediately above the top of the housing 6. Slidably mounted upon said plate or disk 23, is a lock plate 24, which, preferably, is composed of a piece of sheet metal. The said lock plate is slidably connected with said plate 22, by lugs 25, 25ª, that are stamped up from the plate 22, and bent over the upper face of said lock plate 24. In its preferred form, said lock plate 24, is forked to straddle the stud shaft and its sleeve 19, and is arranged to overlie the washer 18, when the steering wheel and pinion have been lowered to active position, as seen in Fig. 1, and to underlie the pinion 12, when the steering wheel and stud shaft have been raised to inactive position. When the steering wheel is held in active position by the lock plate 24, the back of the yoke or forked portion bears against the sleeve 19, as shown in Fig. 3, but when the steering wheel and stud shaft are raised to inactive position, the lock plate is projected farther to the right so that the parts 26, thereof may underlie the pinion itself. To permit of this new position of the lock plate 24, a notch 27, is formed therein which receives part of the spindle or reduced portion 16, of the stud shaft 13.

The lock plate 24, is controlled and operated by a lock 28, which may be in the form of an ordinary pin cylinder lock, fixedly secured in the cap 20, and said lock is provided with a crank arm 29, which is turned by turning the proper key in the lock. Said crank arm is connected to the lock plate 24, by a pin 30, which travels in a slot in an upstanding lug 31, formed on the lock plate 24. Said slot is formed with an upright straight portion 32, and an arcuate portion 33, which is concentric with the axis of rotation of the crank arm 29, when in the position seen in Fig. 1. The purpose of the arcuate portion of the slot is to permit the use of a pin cylinder lock in which the key may be inserted and withdrawn only when the tumblers are in the locked position, such locked position is shown in both Figs. 1 and 2, where it will be seen that the crank arm and pin 30, are in the same location in each figure, but in Fig. 1, the lock plate 24, is located farther to the left than in Fig. 2, because in the first case the lock plate is held against the sleeve 19, (see Fig. 3) whereas in Fig. 2, it is underneath the pinion 12, and closer to the axis of the stud shaft. The lock plate 24, is formed with two upstanding lugs 34, which have notched portions 35, that are arranged to prevent the center pinion 12, from being demeshed from the pinions 9, in case the lock plate 24, is accidentally forced under the washer 18—i. e., before the stud shaft has been lowered to its fully lowered position. In this case the notched lugs 34, will be in position to arrest upward movement of the stud shaft beyond a place where the washer 18, strikes the upper edges of the notches 35. Coiled tension springs 36, connect the upstanding lugs 34, with the plate 22, and act to yieldingly hold the lock plate 24, in position against the stud shaft or its sleeve 19. As shown, the lugs 34, are formed with ears 37, to which hooked ends of the springs 36, are attached, and holes may be formed in the plate 22, to receive the other hooked ends of the springs 36.

To prevent the cap from being unscrewed from the housing 6, by an unauthorized person or at any time except when the key is turned in the lock to unlock the lock, a pawl or dog 38, is provided, which is pivotally mounted upon a rearward extension 39, of the plate 22. The pivotal connection may comprise a rivet 40, extending through the part 39, of the plate 22, and through the dog. Preferably, said dog may be made up of a plurality of similar pieces of hard sheet metal and its pointed end 41, is arranged to bite against the threads of the housing 6. The arrangement is such that when an attempt is made to unscrew the cap from the housing, the pointed end of the dog will bite into the thread and prevent the turning of the cap in a direction to unscrew it. The pawl is moved out of such biting position by the lock plate 24, which is provided with a rearward extension 42, that has a beveled or inclined edge 43, which is arranged to strike against an upstanding pin 44, that is fastened to the dog 38. Said pin projects up through a slot 45, in the rearward extension 39, of the plate 22, and the pawl is normally held in its biting position by a spring 46, which is here shown as connecting said pin 44, with one of the lugs 34.

In operation, the steering post 7, may be turned in the usual manner whenever the steering wheel and stud shaft are in their lowermost position, where the center pinion is in mesh with the pinions 9. To lock the car against theft, the proper key is inserted in the lock 28, and turned in the proper direction to swing the crank arm 29, and pin 30, down and back against the edge of the upstanding portion 32, of the slot, and the continued movement of said pin toward the left, as viewed in Fig. 1, will cause the lock plate 24, to be drawn back, uncovering the washer 18, and thereby permitting upward endwise movement of the washer, stud shaft, sleeve and steering wheel. The steering wheel is then lifted far enough to bring the center pinion above the lock plate 24, whereupon the key is released, permitting the springs 36, to draw the lock plate 24, toward the stud shaft and underneath the center pinion, as seen in Fig. 2. During this movement the pin 30, remains in the vertical or upright portion 32, of the slot and finally reaches the position seen in Fig. 2. The steering wheel and parts connected thereto are now supported by the lock plate 24, which engages directly with the under side of the center pinion, making it impossible to mesh the pinions 12, 9, until the lock plate 24, is retracted. If an unauthorized person attempts to mesh the pinions by removing the wheel and pounding down upon the stud shaft, the center pinion and stud shaft will be prevented from downward movement because of the engagement of the lock plate 24, with the pinion, and it is obvious that if the stud shaft is pounded hard enough, the center pinions may bend or distort the lock plate 24, but it will require unusual force to shear off the lock plate 24, and this must be done to permit the downward movement of the stud shaft and its center pinion whenever the lock plate 24, is in its locked position underneath the center pinion.

To unlock the steering wheel from its locked, idle position, the key is inserted in the lock 28, and again turned in the direction to swing the crank arm 29, and pin 30, downward and back against the vertical edge of the upright portion 32, of the slot in the lug 31, thereby retracting the lock plate 24, back far enough to permit the flange 18, to pass by the same, the steering wheel is then permitted to drop, bringing the center pinion into mesh with the pinion 9, and when the user releases his hold upon the key the springs 36, will draw the lock plate 24, over the washer 18. In other words, it is not necessary to manually turn the key back, as the springs 36, will automatically return the lock plate 24, to locked position whenever permitted to do so. In case it becomes necessary to unscrew the cap, the key is turned to the unlocked position of the pin cylinder lock, thereby drawing the lock plate 24, back against the pin 44, and swinging the dog out of engagement with the thread of the housing 6.

More or less variation of the exact details of construction is possible without departing from the spirit of this invention; I desire, therefore, not to limit myself to the exact form of the construction shown and described, but intend in the following claims to point out all of the invention disclosed herein.

I claim as new, and desire to secure by Letters Patent:

1. A locking device for motor vehicles, comprising a steering post, a stud shaft mounted to move lengthwise of said post, a steering wheel mounted on said stud shaft, a planetary gear connection between said post and stud shaft, the center pinion of which is rigid with said stud shaft and adapted to be demeshed from the other pinions of the planetary gear, said stud shaft having a reduced portion below the pinion, a movably mounted sheet metal center pinion support having two locking positions, one nearer the center of the shaft than the other whereby said support may underlie the center pinion when in its demeshed position and a lock operatively connected with said support, there being a lost motion connection included in the connection between the lock and support whereby the latter may be moved to either locking position.

2. A locking device for motor vehicles, comprising a steering post, a stud shaft mounted to move lengthwise of said post, a steering wheel mounted on said stud shaft, a planetary gearing between the said steering post and said stud shaft, the center pinion of which is made integral with said stud shaft and adapted to be demeshed from the other pinion of the planetary gear, said stud shaft having a reduced portion below the center pinion sliding in the post, and a washer above the center pinion, a movably mounted sheet metal pinion support having two locking positions, one being nearer the center of the shaft than the other, whereby it may underlie and support the center pinion when in its demeshed position and may overlie the washer when the center pinion is in its meshed position and lock controlled actuating means for operating said pinion support, said actuating means having included therein a lost motion connection whereby the support may be moved to either locking position.

3. A locking device for automobiles comprising a steering post, a steering wheel having a stud shaft movable lengthwise of said post from an active to an inactive position, a planetary gear connection between said post and stud shaft, the center pinion of which is made integral with said stud shaft and arranged to be demeshed from the other pinions of the planetary gear, a slidable sheet metal lock plate arranged to underlie said center pinion to thereby support the same in a demeshed condition, and also, to overlie said washer to thereby hold the pinion in meshed condition, said lock plate being formed with an upstanding lug having a slot formed therein comprising an upright portion and an arcuate portion, and a lock having a pin traveling in said slot; substantially and for the purpose set forth.

4. A locking device for automobiles comprising a steering post, a steering wheel having a stud shaft movable lengthwise of said post, a planetary gear connection between said post and stud shaft, the center pinion of which is made integral with said stud shaft and capable of being demeshed from the other gears of the planetary gear, a washer above said center pinion, a centrally apertured supporting plate, a lock plate slidably mounted on said supporting plate, and having upstanding notched lugs capable of arresting upward movement of said washer and therewith, the stud shaft and center pinion, yielding means for yieldingly drawing said lock plate toward a position where its notched lugs arrest movement of said washer, and lock controlled means for operating said lock plate.

5. In a locking device for automobiles, an externally screw threaded housing, a cap threaded upon said housing, a supporting plate secured in said cap, a dog below said supporting plate and pivotally supported thereby, and arranged to bite against the threads of the housing, a pin secured in said dog and projecting up through an arcuate slot in the supporting plate, a spring for holding said dog in biting position secured to said pin, and a lock controlled lock plate having a beveled edge arranged to engage an upstanding pin on said dog to thereby disengage the dog from said housing whenever said lock plate is retracted from locked position.

6. A locking device for motor vehicles, comprising a steering post, a stud shaft mounted to move lengthwise of said post, a steering wheel mounted on said stud shaft, a planetary gear connection between said post and stud shaft, the center pinion of which is rigid with said stud shaft, and adapted to be demeshed from the other pinions of the planetary gear, there being an annular shoulder on said stud shaft above the center pinion and projecting beyond the same, and said stud shaft having a reduced portion below said center pinion, a movably mounted sheet metal center pinion support, arranged to over-lie said annular shoulder when the pinions are in mesh, and to underlie and directly support said center pinion when it is demeshed from the other pinions, and lock controlled operating means for operating said pinion support, there being a lost motion connection for said operating means, whereby the support may be moved to either locking position.

7. A locking device for automobiles comprising a steering post, a steering wheel having a stud shaft movable lengthwise of said post, a planetary gear connection between said post and stud shaft, the center pinion of which is made integral with said stud shaft and capable of being demeshed from the other gears of the planetary gear, a washer above said center pinion, a centrally apertured supporting plate, a lock plate slidably mounted on said supporting plate, and having upstanding means capable of arresting upward movement of said washer and therewith the stud shaft and center pinion, yielding means for yieldingly drawing said lock plate toward a position where said upstanding means may arrest movement of said washer, and lock controlled means for operating said lock plate.

EDWARD E. DAVIS.